Patented June 25, 1946

2,402,740

UNITED STATES PATENT OFFICE 2,402,740

PRODUCTION OF STYRENES

Thomas F. Doumani, Wilmington, and Roland Deery, Long Beach, Calif.; Roland Deery changed by court order to Roland Frank Deering, assignors to Union Oil Company of California, Los Angeles, Calif., a corporation of California No Drawing. Application February 17, 1942, Serial No. 431,274

9 Claims. (Cl. 260—669)

The present invention relates to the dehydrogenation of alkylated aromatic hydrocarbons, such as ethyl benzene and the like, to produce aromatic hydrocarbons containing unsaturated side chains such as styrene and the like.

Processes for producing styrene from ethylbenzene are well known. One of these processes consists in subjecting the ethylbenzene to an elevated temperature of the order of 850–1300° F. in the absence of catalysts. However, the yield of styrene obtained by this process is very low. It is also well known to carry out this reaction in the presence of certain catalysts which result in increasing the reaction rate and thus the yield of styrene. Catalysts which have been known to benefit the reaction include many of the difficultly reducible oxides such as those of calcium, lithium, strontium, magnesium, beryllium, zirconium, tungsten, molybdenum, and uranium. Also, the easily reducible metal oxides or compounds admixed with difficultly reducible metal oxides have been employed. However, the catalytic life of some of these catalysts is relatively short due to reduction of the oxide. The process, therefore, requires periodic regeneration of the catalyst. Also, the products produced when employing such catalysts are frequently contaminated with deleterious side products of reaction which are difficultly removable from the styrene.

It is an object of our invention to use certain catalysts or catalytic materials which advantageously results in increasing the yield of the styrene without the accompanying difficulties of the catalysts heretofore employed.

It is another object of our invention to employ catalysts which are easily prepared and which do not require frequent periodic regeneration.

An important object is to use catalysts which result in producing styrene which may be recovered in pure form.

Other objects of the invention will be apparent to those skilled in the art from the following description:

We have discovered that the use of catalysts composed of carbon containing certain metals, such as nickel, not only increases the reaction rate to a large extent in converting the ethylbenzene to styrene but the catalytic life of the catalyst is maintained at a high level for a considerably longer time than in the case of the heretofore known catalysts. For example, we have found that a catalyst composed of carbon containing from 1 to 20% of metallic nickel is particularly effective for dehydrogenating ethylbenzene to produce a relatively high yield of styrene which may be recovered from the products in substantially pure form. This result is largely unexpected in view of the heretofore knowledge that nickel on such supports as alumina results in the decomposition of the ethylbenzene into toluene and methane.

The carbon-metal catalyst forming the subject matter of our invention may be used as such or may be employed on a porous inactive support such as broken brick, tile and the like. In general, the catalyst is prepared by impregnating a solution of the salt of the metal desired to be retained on the carbon, then drying and decomposing the metal salt to the corresponding oxide and then reducing the oxide to the metal with hydrogen or a hydrogen containing gas at temperatures above 500° F. Preferably, when employing a support for the catalyst, the support is impregnated with the metallic salt, dried and the salt is decomposed with heat to the oxide. Carbon is then deposited on the support by decomposing a hydrocarbon gas at elevated temperatures in the presence of the support containing the oxide and allowing the carbon produced by the decomposition to deposit on the support. The metal oxide is then reduced to the metal by contacting it with hydrogen at temperatures above 500° F.

The dehydrogenation of the alkylated aromatic hydrocarbon is generally carried out by placing the catalyst in a suitable reaction chamber and passing the vapors of the hydrocarbon to be dehydrogenated together with steam through the reaction chamber maintained at elevated temperatures of 800–1600° F., preferably 900–1300° F. and pressures of as low as 10 millimeters absolute to five atmospheres.

The products leaving the reaction chamber will generally consist of the styrene or analogue or homologue thereof, depending upon the charging stock, together with unreacted hydrocarbons, water and hydrogen. By cooling and condensing the products leaving the reaction chamber, the condensable liquids may be separated from the hydrogen and the former may be separated by stratification and decantation into an oily layer and water. The dehydrogenated desired product may be removed from the unreacted or unconverted hydrocarbon in a well known manner such as by cooling of the styrene to crystallize it and then filtering off the crystallized styrene.

The invention may perhaps be best understood by reference to the following examples which are merely illustrative of the invention and are not to be taken as limiting the invention.

Example 1

A carbon-nickel catalyst was prepared as follows:

A commercial nut-shell carbon (Chic-Char sold by Charcoal and Industrial Carbons, Inc.) and having a 20-40 mesh was impregnated with a water solution of nickelous nitrate

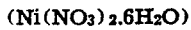

and then dried at a temperature of 400° F. followed by heating in a current of hydrogen at 1200° F. This resulted in first decomposing the nickelous nitrate to nickel oxide and then reducing the oxide to metallic nickel. The resulting catalyst was composed of the charcoal containing about 1% by weight of metallic nickel. In the above preparation of the catalyst, it has been found convenient to dissolve the requisite amount of the nickel salt in such a volume of water that the entire solution is absorbed by the carbon-containing material. In place of the nickelous nitrate, other nickel salts may be employed such as the carbonates and other salts which are decomposable to the metal oxide upon heating.

Approximately 150 ml. of the thus prepared catalyst was placed in a reaction tube. Ethylbenzene was vaporized and preheated to about 500° F. and about 22 ml. of the ethylbenzene vapors and 105 grams of steam at 500° F. were passed in a steady flow through the reaction maintained at about 1200° F. This required about 60 minutes to pass the mixture of ethylbenzene and steam through the reaction zone. The mixture consisting of styrene, unreacted ethylbenzene, water and hydrogen leaving the reactor was condensed by passing the vapors through a suitable condenser which condensed the styrene, ethylbenzene and water leaving a gaseous mixture consisting essentially of hydrogen which was allowed to escape to the atmosphere. The condensate was allowed to stratify into an upper oily layer and a lower aqueous layer which were separated from each other by decantation. The oily layer was analyzed and was found to contain approximately 40% by weight of styrene.

Example 2

Using the same catalyst and conditions as in Example 1, but employing a feed consisting of 20% ethylbenzene and 80% mixed xylenes the process gave a reaction product in which 68% of the ethylbenzene was dehydrogenated to styrene.

Example 3

Another catalyst was prepared as follows:

Commercial diatomaceous earth of 12-20 mesh was impreganated with a nickelous nitrate solution, dried at 400° F. and heated at 900° F. to produce a mixture of diatomaceous earth containing 18% by weight of nickel as nickel oxide. This mixture was then placed in the reaction tube and ethylene gas was passed through the catalyst bed at about 900° F. which resulted in decomposing the ethylene to carbon which was deposited on the catalyst in a very finely divided and soot-like state. The hydrogen produced by the decomposition was removed from the reaction chamber and then additional hydrogen at 900° F. was passed through the catalyst bed to completely reduce the nickel oxide to metallic nickel. The catalyst bed was thus composed of about 150 ml. of a mixture consisting of approximately 18% nickel, 5% carbon and the remainder diatomaceous earth.

Approximately 26 ml. of ethylbenzene and 29 grams of steam at 600° F. were passed through the reactor which was maintained at about 1200° F. This required about 109 minutes. The oily product leaving the reactor was collected as in Example 1 and was found to contain approximately 56% by weight of styrene.

Example 4

Broken pieces of porous fire brick of about one inch at their largest diameter were impregnated with an aqueous solution of nickelous nitrate. The material was then placed in a reactor tube where they are dried at 400° F. and then heated at 900° F. to produce masses of broken brick containing about 8% by weight of nickel as nickel oxide. The uncondensed gases obtained from the cracking of gas oil and consisting essentially of methane, ethane, ethylene, propane and propylene were passed through the reactor which was maintained at about 1300° F. This resulted in decomposing some of the gases to deposit a finely divided carbon on the porous brick and nickel oxide. Hydrogen was then passed through the reactor at about 1300° F. which resulted in completely reducing the nickel oxide to metallic nickel. The catalyst bed was thus composed of the broken brick containing about 8% by weight of metallic nickel and about 9% of the carbon.

Vaporized ethylbenzene and steam were passed through the reactor containing the above catalyst and the products of reaction were separated and collected as in the previous examples. The oily layer was found to contain approximately 85% styrene.

While in the foregoing examples, we have disclosed the conversion of ethylbenzene to styrene, it will be observed that by similar procedure, other alkylated aromatic hydrocarbons such as diethylbenzene, isopropylbenzene, di-isopropylbenzene, ethyltoluene, p-cymene, ethylchlorobenzene, the corresponding naphthalene derivatives, etc. may be converted or dehydrogenated to produce corresponding homologues and analogues of styrene.

Also, other metals may be substituted in the place of nickel in the above catalysts. Such metals include metals of group 8 of the periodic table such as cobalt, iron, and the noble metals such as platinum, palladium, iridium, etc.

Carbon which may be used include wood, vegetable and nut shell charcoals, carbons obtained from the decomposition of petroleum hydrocarbons such as petroleum coke, asphalt, lampblack, etc. However, we have found that the finely divided and soot-like carbons obtained by the pyrolysis of hydrocarbons gave higher yields of styrene than the more compact and solid carbons. In this respect, it is desirable to support the catalyst on a suitable support in order to permit use of the finely divided type carbon. Such suitable supports include clays, zeolites, and various silica containing materials.

The foregoing is illustrative and not to be taken as limiting the invention, which may include any method which accomplishes the same within the scope of the appended claims.

We claim:

1. A process for the manufacture of aromatic hydrocarbons containing unsaturated side chains from alkylated aromatic hydrocarbons having a side chain which has at least 2 carbon atoms which comprises subjecting said alkylated aromatic hydrocarbon to an elevated dehydrogenation temperature in the presence of a catalyst prepared by impregnating carbon with a salt of a metal selected from the eighth group of the periodic table, heating the impregnated carbon to dry it and convert said metal salt to the corresponding metal oxide, and reducing the said oxide to the free metal.

2. A process according to claim 1 in which the metal is nickel.

3. A process for the manufacture of aromatic hydrocarbons containing unsaturated side chains from alkylated aromatic hydrocarbons having at least 2 carbon atoms in one of the side chains which comprises subjecting said alkylated aromatic hydrocarbon to an elevated dehydrogenation temperature in the presence of a catalyst prepared by impregnating carbon with a salt of a group eight noble metal selected from the group consisting of platinum, palladium, iridium, rhodium, osmium and ruthenium, heating the impregnated carbon to dry it and to convert said metal salt to the corresponding metal oxide, and reducing said oxide to the free metal.

4. A process for the manufacture of aromatic hydrocarbons containing unsaturated side chains from alkylated aromatic hydrocarbons having at least 2 carbon atoms in one of the side chains which comprises subjecting said alkylated aromatic hydrocarbon to an elevated dehydrogenation temperature in the presence of a catalyst prepared by impregnating carbon with a salt of a metal selected from the eighth group of the periodic table, heating the impregnated carbon to dry it and convert said metal salt to the corresponding metal oxide, and reducing the said oxide to the free metal, said catalyst containing approximately 1% of said metal.

5. A process for the manufacture of aromatic hydrocarbons containing unsaturated side chains from alkylated aromatic hydrocarbons having at least 2 carbon atoms in one of the side chains which comprises subjecting said alkylated aromatic hydrocarbon to an elevated dehydrogenation temperature in the presence of a catalyst prepared by impregnating a porous inactive supporting material with a salt of a metal selected from the eighth group of the periodic table, heating said impregnated material to dry it and to decompose the metal salt to form the corresponding metal oxide, contacting the resulting product with a hydrocarbon at a temperature sufficiently high to decompose said hydrocarbon with deposition of finely divided carbon on said product and reducing the resulting material to convert the oxide to the free metal.

6. A process according to claim 5 in which the metal is nickel.

7. A process according to claim 5 in which the hydrocarbon that is decomposed to form carbon comprises a normally gaseous olefin.

8. A process for the manufacture of aromatic hydrocarbons containing unsaturated side chains from alkylated aromatic hydrocarbons having at least 2 carbon atoms in one of the side chains which comprises subjecting said alkylated aromatic hydrocarbon to an elevated dehydrogenation temperature in the presence of a catalyst comprising about 1% of nickel impregnated on carbon.

9. A process for the manufacture of styrene from ethyl benzene which comprises subjecting ethyl benzene to a temperature between about 800° F. and 1600° F. in the presence of styrene and a catalyst prepared by impregnating diatomaceous earth with a solution of nickel nitrate, drying the product and heating it to convert the nickel nitrate to nickel oxide, treating the resulting material with ethylene at such a temperature as to decompose the ethylene to carbon and deposit said carbon on the catalyst in a finely divided state, and treating this product with hydrogen to reduce the nickel oxide to metallic nickel.

THOMAS F. DOUMANI.
ROLAND DEERY.